March 13, 1951
C. C. BRAYTON
2,545,134
CONVEYER
Filed Aug. 14, 1946
2 Sheets-Sheet 1
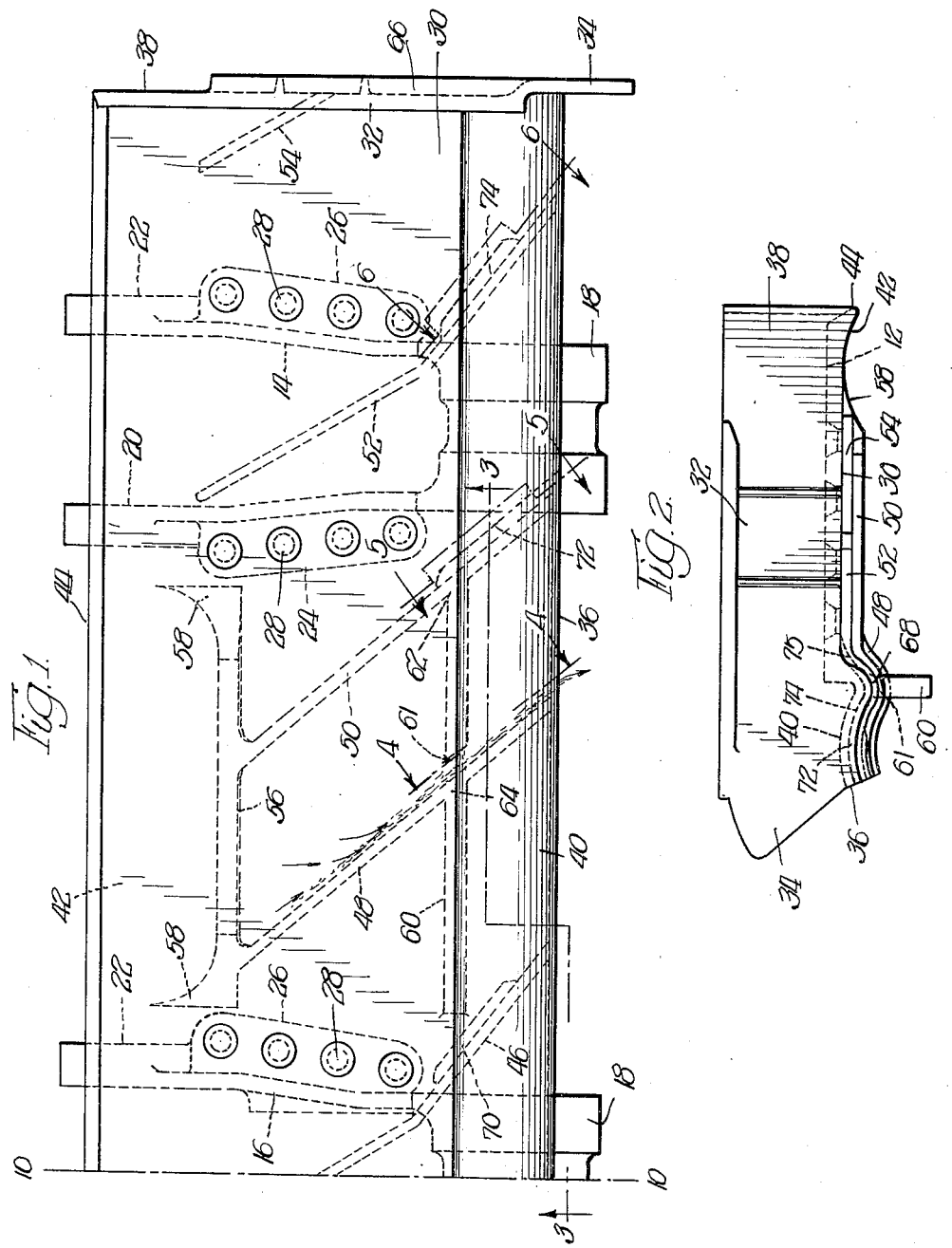
INVENTOR.
Corey C. Brayton,
BY
Wilkinson, Huxley, Byron, & Knight
Attys.

March 13, 1951          C. C. BRAYTON          2,545,134
                           CONVEYER
Filed Aug. 14, 1946                         2 Sheets-Sheet 2
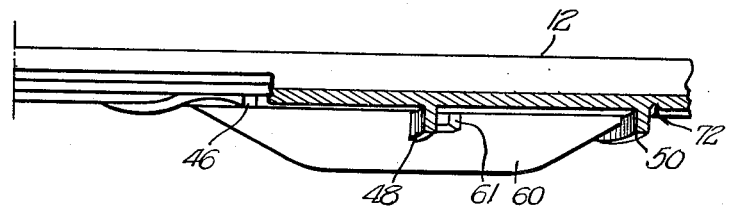
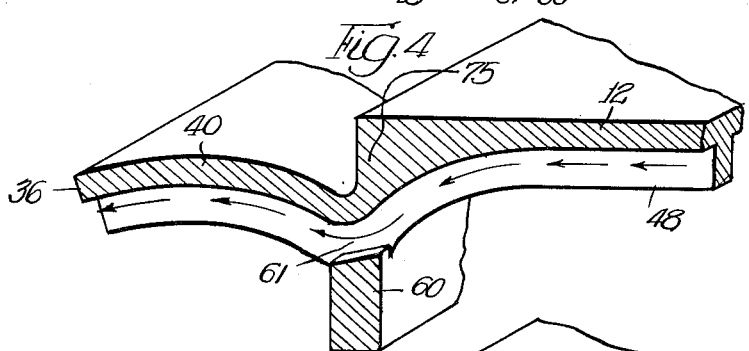
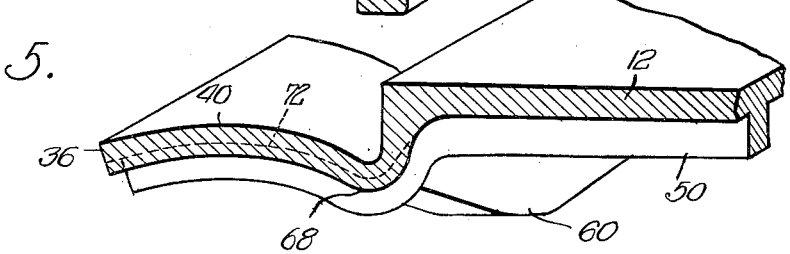
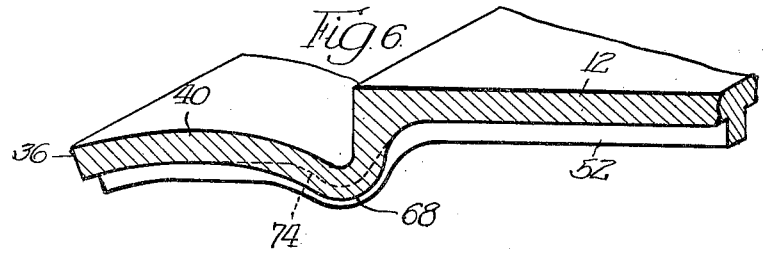
INVENTOR.
Corey C. Brayton,
BY
Wilkinson, Huxley, Byron, & Knight Patented Mar. 13, 1951

2,545,134

UNITED STATES PATENT OFFICE 2,545,134

CONVEYER

Corey C. Brayton, Oakland, Calif., assignor to American Brake Shoe Company, New York, N. Y., a corporation of Delaware Application August 14, 1946, Serial No. 690,413

4 Claims. (Cl. 198—195)

This invention relates to improvements in conveyors of that type having a plurality of flexibly connected pans mounted on drive chains to form an endless conveyor or feeder, and more particularly to such conveyors having pans with directing means on the bottom thereof to cause material collecting on the bottom of the pans, when inverted during the bottom run of the conveyor, to be discharged laterally from the bottom of said pans as they move from the bottom run to the upper run of said conveyor.

Feeders of this type are often used in very heavy work, such as the transporting of ore or rock, and under conditions of hard usage the pans in general use today often bend between the chain supports to such an extent that it is necessary to remove and straighten them. The pans should therefore be designed to withstand heavy loads and severe shocks without bending. Up until now the only method of achieving this result has been limited to making the pans of sufficient thickness to withstand this type of use. This method of strengthening the pans has been adopted since no other method of reinforcing the pan on the bottom surface that does not interfere with the free flow of the material off the pans has been developed. In addition, the upper or load carrying surface of the pans must be kept smooth and free from obstructions to prevent fouling.

However, in the interest of economy and efficient operation, it is desirable to have pans that are as light in weight as possible, and yet which do not readily become distorted.

It is therefore an object of this invention to provide pans for endless conveyors which have means for directing the flow of material off of the bottom surfaces of the pans, and which are sufficiently reinforced to prevent bending during use, but which are comparatively light in weight.

It is a further object to provide pans for such conveyors which have reinforcing members on the bottom surfaces of the pans which do not interfere with the free flow of material directed over the sides of the bottom surfaces by guiding members.

Other objects, features, capabilities and advantages are comprehended by the invention, as will later appear and are inherently possessed thereby.

In the drawings:

Figure 1 is a plan view taken from above the load carrying surface of one-half of a pan for conveyors illustrating one embodiment of the invention, the complete pan being symmetrical about the center line 10—10;

Figure 2 is a view in elevation of one side of a whole pan, one-half of which is shown in Figure 1;

Figure 3 is an elevational view partly in vertical cross section of a portion of the pan shown in Fig. 1, the view being taken along the line 3—3 of Figure 1;

Figure 4 is a fragmentary perspective view, partly in vertical cross section, of a portion of the floor of the pan, the cross section being taken along the line 4—4 of Figure 1;

Figure 5 is a fragmentary perspective view, partly in vertical cross section, of a portion of the floor of the pan, the cross section being taken along the line 5—5 of Figure 1, and Figure 6 is a fragmentary perspective view, partly in vertical cross section, of a portion of the floor of the pan, the cross section being taken along the line 6—6 of Figure 1.

Referring now more in detail to the drawing, one-half of a pan illustrating one embodiment of the invention is shown in Fig. 1, the whole pan being symmetrical about the center line 10—10. The floor 12 of the pan to which are attached laterally coinciding links of three drive chains, is generally rectangular in shape. One link 14 of one of the outer chains is shown in full, while only one-half of the laterally corresponding link 16 of the center chain is shown. Each of the links comprising the three drive chains are of similar construction being generally U-shaped and having a hub 18 with the substantially parallel arms 20 and 22 extending from opposite ends of the hub. The arms 20 and 22 have the flanges 24 and 26 extending therefrom, respectively, which provide a means for securing the link to the bottom of the floor 12 in cooperation with holding means such as the rivets 28, or the like. When so secured the flanges support the main body of the link, including the hub 18 and the arms 20 and 22, in spaced relation to the bottom surface 30 of the floor 12 of the pan.

The hub 18 is adapted to fit between the arms 20 and 22 of the identical link of an adjacent pan, said hub and arms being apertured to receive a pin and thus providing a pivotal joint between links of adjacent pans. The links are adapted to engage the teeth of drive sprockets operating the conveyor and are preferably constructed so that, when hinged together, they form a chain flexible in one direction and rigid in the opposite direction. This enables the chain to flex when passing over the driving sprockets, but prevents it from sagging when carrying a load on the upper run of the conveyor.

The construction described above is substantially in accordance with the disclosure in the Sutherland Patent No. 1,565,760.

As shown in Figures 1 and 2, the pans are provided with the side walls 32 having the end 34 extending beyond the rear marginal edge 36 of the floor 12 and adapted to overlap the complementary end 38 of the side walls 32 of the next adjacent pan to which the first named pan is hinged.

The curved portion 40 of the floor 12 adjacent the rear marginal edge 36 of each pan is also adapted to overlap the complementary curved portion 42 of the floor adjacent the front marginal edge 44 of the next adjacent pan. These two overlapping portions of adjacent pans are formed as arcs of two concentric circles, the common center of which is the axis of the pin which hinges the two pans together. Thus, when the pans pass over the drive sprockets, the flexing of the pans is accomplished without producing appreciable gaps between them. In spite of these articulated joints between pans, some of the material carried by the pans sifts through and around the top run of the conveyor and collects on the inverted pans on the bottom run.

To direct this material laterally off the bottom surfaces of the pans the spill ribs 46, 48, 50, 52 and 54 are formed as integral parts of the bottom surface 30 of the floor of each pan. The first rib 46, which is that closest to the center line 10—10, extends from a point substantially at the midpoint of that center line diagonally and outwardly to a point in spaced relation to the rear edge of the flange 26 of the center chain link 16 and continues, at a greater angle to the center line 10—10 of the pan, diagonally and outwardly to the marginal edge 36 of the pan.

The reinforcing rib 56 which is adjacent the inner edge of the curved portion 42 of the floor 12 has a construction such that it offers as little interference as possible to the free flow of material down the bottom surfaces 30 of the pans, as the pans move from the bottom run to the top run of the conveyor. This is accomplished by having the side of the rib 56 nearest the front marginal edge 44 of the pan disposed to form a continuation of the curved portion 42 on the floor 12. This provides a surface which enables the material flowing from one pan to the next succeeding pan to pass freely over the rib 56 toward the rear marginal edge 36 of the last named pan.

The two ends 58 of the rib 56 are tapered so that they are flush with the bottom surface 30 of the floor 12 at their outer extremities, which causes these ends to have a substantially triangular shape as shown in Fig. 1. The height of this rib throughout its central section is substantially greater than the height of the spill rib 46 previously described.

The second spill rib 48 is of substantially the same height as the reinforcing rib 56, and extends from a point on that rib near its inner end, diagonally and outwardly to the rear marginal edge 36 of the pan. The third spill rib 50 is also of substantially the same height as the reinforcing rib 56, and extends from a point on that rib between the point of intersection of the rib 48 with the rib 56 and the outer end of the rib 56, diagonally and outwardly to the rear marginal edge 36 of the pan.

The portion of the floor 12 of the pan between these two spill ribs 48 and 50 and adjacent the inner edge of the curved portion 40 of the pan is that which is most susceptible to the possible deformation described above, resulting from hard usage. It is therefore desirable to provide some method of reinforcement in this area. The reinforcing rib 60 is therefore formed integrally with the bottom surface 30 of the floor 12, extending parallel to the edge 36 substantially at the lowermost portion of the curved section 40 of the pan as shown in Figs. 2, 5 and 6. Maintaining the original alignment of this area of the pan floor is particularly important, since if this portion is displaced horizontally or vertically with reference to the other parts of the floor of the pan, openings will be produced in the articulated joints between pans. This will, in turn, cause a large increase in the amount of material sifting through to the bottom run of the conveyor.

This reinforcing rib is therefore of substantially greater height than the spill ribs 48 and 50 and extends from a point in spaced relation to the outer side of the first spill rib 46 to the third rib 50 which it intersects, at the point 62 as shown in Figs. 1 and 3. The reinforcing rib therefore also intersects the second spill rib 48 at the point 64. Such a disposition of rib 60, because of its relatively great height, would normally form a substantial barrier to the free flow of material down the outer edge of the second rib 48. Material would collect at this point, on the outer and upper side of the intersection and would be carried with the pan as it moved up to the upper run from the lower run of the conveyor, until the pan became sufficiently inverted to cause the material to fall from that pan. This would create the same problem that the spill ribs are designed to alleviate.

Consequently, as shown in the drawings, the reinforcing rib 60 is provided with the opening 61 adjacent the side of the second rib 48 nearest the side marginal edge 66 of the pan. This allows the material directed by the intersecting rib 48 to flow through the reinforcing rib 60, off the rear marginal edge 36, and onto the next succeeding pan, falling between the third and fourth ribs 50 and 52 of that pan. This process is repeated continually as the pans move from the lower run to the upper run, the material carried by the lower surfaces 30 of the pans gradually moving laterally until it falls over the side marginal edge 66 of one of the pans.

The fourth spill rib 52 extends diagonally and outwardly from a point between the two flanges of the link 14 to a point in spaced relation to the rear edge of the flange 26 of that link. It then continues at a greater angle to the center line 10—10, to the rear marginal edge 36 of the pan.

The fifth spill rib 54 extends diagonally and outwardly from a point between the link 14 and the marginal edge 66 and adjacent to the curved portion 42 of the floor 12, and terminates at that marginal edge. As shown in Figs. 1, 2, 5 and 6, the channels 70, 72 and 74 are formed in the bottom surface 30 of the pan adjacent to the outer edges of the spill ribs 46, 50 and 52, where they cross the most sharply curved portion 68 of that bottom surface. These channels, in effect, reduce the height of the obstruction to the flow of material presented by this sharply curved portion, and also provide a more gradual incline leading up to the highest point of the obstruction. This gradual incline is already provided adjacent the rib 48 where it crosses the most sharply curved portion 68 by the contour of the base 75 of the reinforcing rib 60 as shown in Figs. 2 and 4.

The drawing and the above discussion are not intended to represent the only possible form of this invention, in regard to details of construction. Changes in form and in the proportion of parts, as well as the substitutions of equivalents are contemplated, as circumstances may suggest or render expedient, without departing from the spirit or scope of this invention.

I claim:

1. A segment of an endless conveyor, which conveyor is made up of a plurality of such segments flexibly connected in overlapping relation, so that said conveyor is adapted to carry material on the upper run thereof, a plurality of spill ribs on the bottom surface of said segment disposed diagonally to the line of movement of said conveyor, each said spill rib extending outwardly away from the longitudinal axis of said conveyor in a direction opposite to said direction of movement of said conveyor toward one of the marginal edges of said segment and at least one reinforcing member on the bottom surface of said segment disposed transversely with respect to the longitudinal axis of said conveyor and intersecting at least one of said spill ribs, said reinforcing member having an opening therein adjacent the outer edge of each intersected spill rib that extends beyond said reinforcing member substantially in the direction of movement of said conveyor.

2. A segment of an endless conveyor, which conveyor is made up of a plurality of such segments flexibly connected in overlapping relation, so that said conveyor is adapted to carry material on the upper run thereof, a plurality of spill ribs on the bottom surface of said segment disposed diagonally to the line of movement of said conveyor, each said spill rib extending outwardly away from the longitudinal axis of said conveyor in a direction opposite to said direction of movement of said conveyor to one of the marginal edges of said segment, the bottom surface of said segment having a convex configuration adjacent its rear marginal edge and having a plurality of grooves adjacent said ribs in the convex portion of said surface.

3. A segment of an endless conveyor, which conveyor is made up of a plurality of such segments flexibly connected in overlapping relation, so that said conveyor is adapted to carry material on the upper run thereof, a plurality of spill ribs on the bottom surface of said segment disposed diagonally to the line of movement of said conveyor, each said spill rib extending outwardly away from the longitudinal axis of said conveyor in a direction opposite to said direction of movement of said conveyor toward one of the marginal edges of said segment and therefore being adapted to direct the flow of material normally collecting on said bottom surface toward the sides of said segment in predetermined paths of flow when said segment moves from said lower run to said upper run of said conveyor and at least one reinforcing member on the bottom surface of said segment intersecting at least one of said spill ribs, said reinforcing member having an opening therein at each point at which said member crosses one of said paths of flow of said material.

4. A segment of an endless conveyor, which conveyor is made up of a plurality of such segments flexibly connected in overlapping relation, so that said conveyor is adapted to carry material on the upper run thereof, a plurality of spill ribs on the bottom surface of said segment disposed diagonally to the line of movement of said conveyor, each said spill rib extending outwardly away from the longitudinal axis of said conveyor in a direction opposite to said direction of movement of said conveyor toward one of the marginal edges of said segment and therefore being adapted to direct the flow of material normally collecting on said bottom surface toward the sides of said segment in predetermined paths of flow when said segment moves from said lower run to said upper run of said conveyor, each said bottom surface of said segment having a convex configuration adjacent its rear edge and having a plurality of grooves in said convex portion substantially coincident with said paths of flow of said material.

COREY C. BRAYTON.

REFERENCES CITED

The following references are of record in the file of this patent:

UNITED STATES PATENTS

| Number | Name | Date |
|---|---|---|
| 1,565,760 | Sutherland | Dec. 15, 1925 |
| 2,406,279 | Anderson | Aug. 20, 1946 |